US010965770B1

(12) United States Patent
Vilcinskas et al.

(10) Patent No.: US 10,965,770 B1
(45) Date of Patent: Mar. 30, 2021

(54) DYNAMIC OPTIMIZATION OF REQUEST PARAMETERS FOR PROXY SERVER

(71) Applicant: metacluster It, UAB, Vilnius (LT)

(72) Inventors: Eivydas Vilcinskas, Siauliai (LT); Martynas Juravicius, N. Utos eldership (LT); Giedrius Stalioraitis, Vilnius (LT)

(73) Assignee: metacluster It, UAB, Vilnius (LT)

( * ) Notice: Subject to any disclaimer, the term of this patent is extended or adjusted under 35 U.S.C. 154(b) by 0 days.

(21) Appl. No.: 17/018,333

(22) Filed: Sep. 11, 2020

(51) Int. Cl.
*H04L 29/08* (2006.01)

(52) U.S. Cl.
CPC .............. *H04L 67/28* (2013.01); *H04L 67/02* (2013.01); *H04L 67/146* (2013.01)

(58) Field of Classification Search
CPC ........ H04L 67/02; H04L 67/146; H04L 67/28
See application file for complete search history.

(56) References Cited

U.S. PATENT DOCUMENTS

| | | | |
|---|---|---|---|
| 9,197,538 B2 | 11/2015 | Hopen et al. | |
| 9,207,953 B1 | 12/2015 | Shokhor | |
| 9,544,285 B2 | 1/2017 | He et al. | |
| 10,177,967 B2 | 1/2019 | Lakes et al. | |
| 10,594,820 B2 | 3/2020 | Pattison et al. | |
| 2002/0198939 A1 | 12/2002 | Lee et al. | |
| 2005/0125412 A1* | 6/2005 | Glover | G06F 16/951 |
| 2008/0162448 A1* | 7/2008 | Jalan | G06F 16/951 |
| 2012/0143844 A1* | 6/2012 | Wang | G06F 16/951 |
| | | | 707/709 |
| 2015/0096036 A1* | 4/2015 | Beskrovny | H04L 63/1433 |
| | | | 726/25 |
| 2016/0188720 A1* | 6/2016 | Schlesinger | H04L 67/42 |
| | | | 707/709 |
| 2018/0048673 A1* | 2/2018 | Hunt | G06F 21/562 |

* cited by examiner

*Primary Examiner* — Gil H. Lee
(74) *Attorney, Agent, or Firm* — FisherBroyles LLP; Keats A. Quinalty

(57) ABSTRACT

Systems and methods of task implementation are extended as provided herein and target the web crawling process through a step of submitting a request by a customer to a web crawler. The systems and methods allow a more complex request for a web crawler to be defined in order to receive more specific data. In one aspect, a method for data extraction and gathering from a Network by a Service provider infrastructure include the following steps: checking the parameters of a request received from a User's Device, adjusting the request parameters according to pre-established Scraping logic, selecting a Proxy according to the criteria of the pre-established Scraping logic, sending the adjusted request to the Target through the selected Proxy, checking metadata received from the Target, and forwarding the data to the User's device.

26 Claims, 9 Drawing Sheets

DYNAMIC OPTIMIZATION OF REQUEST PARAMETERS FOR PROXY SERVER

FIELD

In one aspect, the embodiments detailed herewithin relate to data retrieval from the web to improve the communication between a user and technology used to access publicly available Internet resources. The embodiments detailed herewithin use data gathering technologies to more efficiently gather large amounts of data from public web resources.

BACKGROUND

Proxy servers are intermediate servers that accept requests from clients and forward the requests to other proxy servers, a source server, or service the request from their own cache. Proxy servers are computing devices connected to a network that serve as intermediaries for customer computing devices, requesting services or data from "network resources", accepting the requests from customers proxy servers and either forwarding the request to another proxy, redirecting to the requested resource, or serving the request from their own cache, located locally or remotely, or distributed across multiple systems.

The proxy is also called 'server' or 'gateway'. A proxy allows users on a network to browse the Web, send files over File Transfer Protocol (FTP), and work with e-mail and other Internet services. In one aspect, a proxy operates in the following manner: i) receives a request from a user in a public network, or private network separated by a firewall, to a remote server that contains the desired content; ii) creates a proxy tunnel toward the remote server; iii) forwards the request to the remote server through the established tunnel; iv) receives the response from the remote server; and v) forwards the response back to the user.

The proxies can be divided into different types depending on what functions are provided or what servers are used. The proxies can also be divided into residential internet protocol (IP) proxies, datacenter IP proxies, and mobile IP proxies. A residential IP proxy is an IP address linked to a physical device, for example, mobile phone or desktop computer. The real owners of the residential IP proxies, namely, Internet service providers (ISPs), register residential IP addresses in public databases, which allows websites to determine a device's internet provider, network, and location. Datacenter IP proxy is the proxy server assigned with a datacenter IP. Datacenter IPs are IPs owned by companies not by individuals. The datacenter proxies are actually IP addresses that are not located in a household. Instead, the datacenter proxies are associated with a commercial datacenter. Mobile IP proxies act similar to residential proxies in that they are assigned their IP address by a mobile operator from a pool of IP addresses designated to mobile clients. Mobile IP proxies use mobile data, as opposed to a residential proxy that uses broadband ISP connectivity.

A proxy server is basically a computer on the internet with its own IP address that the client's computer "knows". When a client sends a web request, the request is sent to the proxy server first. The proxy server then makes the web request on the client's behalf, collects the response from the web server, and forwards the web page data so that the client can see the page in the browser or in another manner e.g. as data written in a file on the disk for bulk processing by data aggregation and analysis tools. When the proxy server forwards the web requests, the proxy server can make changes to the data but yet provide the data requested. For example, a proxy server can change the client's IP address, so the web server is not provided the geographical location of the client. Also, a proxy server can block access to certain web pages, based on IP address or domain name.

Modern proxy servers do much more than simply forwarding web requests. For example, modern proxy servers can perform several additional functions to increase data security and network performance. Proxy servers can act as a firewall and web filter, provide shared network connections, and cache data to speed up common requests. Proxy servers can provide a high level of privacy. Proxy servers can change the IP address and other identifying information the web request contains (e.g., so that the destination server does not know who made the original request). Proxy servers can also be used to control internet usage of employees and children (e.g., organizations and parents set up proxy servers to control and monitor how their employees or kids use the Internet) or improve browsing speeds and save bandwidth (e.g., proxy servers can cache (save a copy of the appropriate website data locally) popular websites and, when a request is made, will send the saved copy to the client).

Proxies can be used to bypass certain Internet restrictions (e.g. firewalls) by enabling a user to request the content through a (remote) proxy server instead of accessing the content directly. Proxy servers are often used to get around geo-IP based content restrictions. If someone wants to get content from, for example a United States (US) webpage, but they do not have access from their home country, they can make the request through a proxy server that is located in the US (and has a US IP address). Using proxy services, the user's traffic seems to be coming from the US IP address. Proxies can also be used for web scraping, data mining, and other similar tasks.

Data gathering from the web is an important and often vital task for many business domains. The importance and value of data is ever-increasing and therefore the need for more efficient tools of data retrieval and analysis is growing. The two main tools for accessing data sources on the web are web crawling and web scraping.

The general purpose of web crawling is to access publicly available web resources (usually web pages), retrieve their content, and forward the content to the user. The basic purpose of web scraping is to analyze the data retrieved by the web crawler and extract information requested by the user.

A web crawler (also known as a web spider, bot) is a program or automated script which navigates the web in a methodical, automated manner. Its primary task is to gather the information ordered by the user. The web crawler does so by browsing the web for the requested info and retrieving raw Hypertext Markup Language (HTML) code of the accessed web sites. Another purpose of utilizing web crawling is the indexing of web content by search engines.

Web scraping (also known as web harvesting, web data extraction) is a process of fetching the accessed web pages and parsing the content for the requested data. Web scraping can be done manually by hand, but typically consists of automated processes implemented using a web crawler.

Web crawling and web scraping tools are often used together as the scraping functionality heavily depends on web crawling results. More specifically, web crawling is a main component of web scraping. Data accessed and fetched by a web crawler is then processed by a web scraper which analyses the fetched content and extracts the required data.

The operation of a web crawler undergoes a sequence of tasks including taking in the request, gathering data, and delivering data. More specifically, the tasks of a web crawler include: accepting the request from the user, managing the request queue; balancing the load between processing services; attempting to retrieve the requested data; data storage; and data delivery. The task of attempting data retrieval further includes managing Hypertext Transfer Protocol (HTTP) and Hypertext Transfer Protocol Secure (HTTPS) requests, rotating proxies, and headers.

A web crawler uses a standard HTTP/HTTPS request/response model to call and access targets. This model describes the client-server communication via the web. A client sends an HTTP request to the server asking for access to specific data. A server sends an HTTP response back to the client with the requested data. The HTTP request indicates the target Uniform Resource Locator (URL), the access method, and the headers. The HTTP response returns status information, the headers, and the requested data.

HTTP headers let the client and the server pass additional information with an HTTP request or response. Headers can be grouped according to their contexts.

General headers apply to both requests and responses, but with no relation to the data transmitted in the body. Request headers contain more information about the resource to be fetched, or about the client requesting the resource. Response headers hold additional information about the response, e.g. the URL of the source web page or the server providing the response. Entity headers contain information about the body of the harvested web page, e.g. its content length or type of content.

Headers can also be grouped according to how proxies handle them, e.g. Connection, Keep-Alive, Proxy-Authenticate, Proxy-Authorization, and others.

End-to-end headers: these headers must be transmitted to the final recipient of the message: the server for a request, or the client for a response. Intermediate proxies must retransmit these headers unmodified and caches must store them.

Hop-by-hop headers: these headers are meaningful only for a single transport-level connection, and must not be retransmitted by proxies further on, or cached. It should be noted that only hop-by-hop headers may be set using the Connection general header. A significant detail of the functionality utilizing hop-by-hop headers is the fact that such headers are transmitted exclusively between the device originating the request and the proxy, whereas the primary purpose of such headers is to support management of the corresponding proxy session.

An HTTP cookie (web cookie, browser cookie) is a small piece of data that a server sends to the user's web browser. The browser may store the cookie and send it back with later requests to the same server. Typically, the cookie is used to tell if two requests came from the same browser—keeping a user logged-in, for example. The cookie remembers stateful information for the stateless HTTP protocol.

Cookies are mainly used for three purposes: 1) Session management (logins, shopping carts, game scores, or anything else the server should remember); 2) Personalization (user preferences, themes, and other settings); 3) Tracking (recording and analyzing user behavior).

The HTTP request's Cookie header contains stored HTTP cookies previously sent by the server with the Set-Cookie header. The Cookie header is optional and may be omitted if, for example, the browser's privacy settings block cookies.

The GET method is used to retrieve information from the target. When adhering to the REST API guidelines requests using GET method only retrieve but do not change or otherwise affect the source data. The POST method is used to submit data to the specified resource. Requests, using POST method create, or, if REST guidelines are not strictly obeyed, update the source data.

The POST method allows the user to send data to the web target and submit it. This data is included into an HTTP message body carried by HTTP request. This data needs to be encoded before being sent through the system's operating steps. Data is encoded for data security reasons. Data is encoded before HTTP request is sent to the proxy server.

The protocol used to carry connection information across proxies is called the proxy protocol. The proxy protocol provides a convenient way to safely transport connection information such as a client's address across multiple layers of Network Address Translation schemes (NAT) or TCP proxies. It is designed to require little changes to existing components and to limit the performance impact caused by the processing of the transported information.

Proxy protocol header is the block of connection information the connection initiator prepends at the beginning of a connection, which makes it where the header is correspondingly the authoritative designation of the source of the connection from the protocol point of view.

The proxy protocol's goal is to fill the server's internal structures with the information collected by the proxy that the server would have been able to get by itself if the client was connecting directly to the server instead of via a proxy. The information carried by the protocol are such that the server would get using getsockname( ) and getpeername( ) methods:

- address family (AF_INET for IPv4, AF_INET6 for IPv6, AF_UNIX)
- socket protocol (SOCK_STREAM for TCP, SOCK_DGRAM for UDP)
- layer 3 (IP) source and destination addresses
- layer 4 (e.g. TCP or UDP) source and destination ports if any The whole header will always be delivered at once when the socket buffers are still empty at the beginning of a connection. The sender must always ensure that the header is sent at once, so that the transport layer maintains atomicity along the path to the receiver. The receiver may be tolerant to partial headers or may simply drop the connection when receiving a partial header.

The web crawler has two main approaches to task implementation: synchronous and asynchronous. The synchronous method (also known as a real-time method) fetches data to the user using the same connection. The asynchronous method (also known as a callback method) establishes and uses a different connection for data delivery. The presented embodiments generally function in the synchronous web scraping model.

When using the synchronous data delivery method, the user submits the request to the web crawler, and the crawler returns the requested data on the same open HTTP(S) connection. Because the asynchronous data delivery method provides an option to decide when to retrieve the requested data, there is no need to keep an open connection between the customer and the backend services, such as a web crawler. The web crawler informs the user when the data is ready. In both cases, the task for the web crawler is formulated by providing a list of target URLs that the crawler has to attempt to access.

SUMMARY

There are several problems associated with web crawler performance, including insufficient information that is harvested from the content sources, inadequate characteristics of the request, and limited capabilities of proxies employed. A next generation proxy can be used for additional purposes than simply forward the traffic from the user and return the information. Next generation proxies can see the user's information and amend the information if needed to get better scraping results. With next generation proxy it is possible to keep using the logic that depends on proxies. Furthermore, most of the unblocking logic that a user would need to manage personally can be performed by a next generation proxy. Users do not need to know the logic to overcome blocking restrictions, which becomes part of the scraping functionality employed by the service provider. Next generation proxy has the ability to adjust the scraping logic to bypass potential restrictions and hindrances.

In one aspect, the embodiments detailed herewithin disclose a method of optimizing the parameters of a user's scraping request at the Service Provider's side. When processing the scraping request that is directed at a Target through HTTPS protocol, the standard Transport Layer Security (TLS) handshake takes place between the Service provider's infrastructure, i.e. the actual scraping agent, and the Target, whereas the exit node employed for said request is traversed through by using a HTTP method—CONNECT—for establishing a network transport layer tunnel to the target on behalf of the scraping device.

The embodiments detailed herewithin extend the methods of task implementation, including targeting one step of a web crawling process—a step of submitting a request by a customer to a web crawler. The embodiments detailed herewithin allow defining a more complex request for a web crawler and therefore receiving more specific data. The data fetching system and method of the web crawler remains unaltered. This includes the same general web crawler task flow of accepting the request from the user, attempting to retrieve the requested data, and delivering data to the user.

The embodiments detailed herewithin operate in an environment of a data fetching system, i.e. user—data fetching system—target on the web, and detail an inseparable structural and functional element of a data fetching system. In essence, the embodiments detailed herewithin enhance the system in three areas: task definition, secure task implementation, and result optimization. The embodiments detailed herewithin allow the user to formulate more comprehensive tasks for a data-fetching system, including the ability to submit HTTP request headers and cookies instead of submitting just a URL in bare minimum data-fetching systems not enriched with request parameters awareness functionality.

Next generation proxy allows the user to create a token, by which the proxy can reuse the same IP address or session. In operation of a data-fetching system, a session is maintained by keeping the same exit node of a proxy server for multiple HTTP requests.

In addition to the regular functioning of this feature, the embodiments detailed herewithin allow sending custom HTTP headers and cookies through the reserved exit node. Support of POST requests allows the user to send data to the web target during the same session as well. In the regular operation of the data fetching system, the GET method is used in HTTP requests to call the target. The embodiments detailed herewithin allows the POST method to be used as well. In the GET method, which is the default setting, there is no need to declare the HTTP request, whereas the POST method must be declared explicitly.

The embodiments detailed herewithin allow the user to declare specific, other than default, HTTP response status codes as passable. The system treats the responses with the declared status codes as correct and passes the fetched data to the next data processing step. Specific status codes are declared in the HTTP request message.

The embodiments detailed herewithin allow checking whether the user's URL is correct and, if not, making modifications to the URL (in a manner that the URL is not blocked by the target). The solution also allows modifying of the HTTP headers and cookies or adding needed HTTP headers or cookies if HTTP headers or cookies are not adequately configured or set by the user for proxying.

The embodiments detailed herewithin allows retrying the user's requests without notifying the user. User does not need to resend the request repeatedly. The next generation proxy sees that the request was not implemented correctly and resends the requests to the target again, until the satisfactory results are gathered. Therefore, the next generation proxy highly increases the success rate of the scraping results.

The next generation proxy can verify the parameters provided by the user in real time and directly inform that the parameters are lacking in technical detail or are insufficient to ensure the proper request-reply session context. The next generation proxy may also utilize the functionality of scraping through a big pool of proxy IP addresses as an added layer of safety against blocking or contaminating results by the anti-scraping techniques.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION

Figure 1:
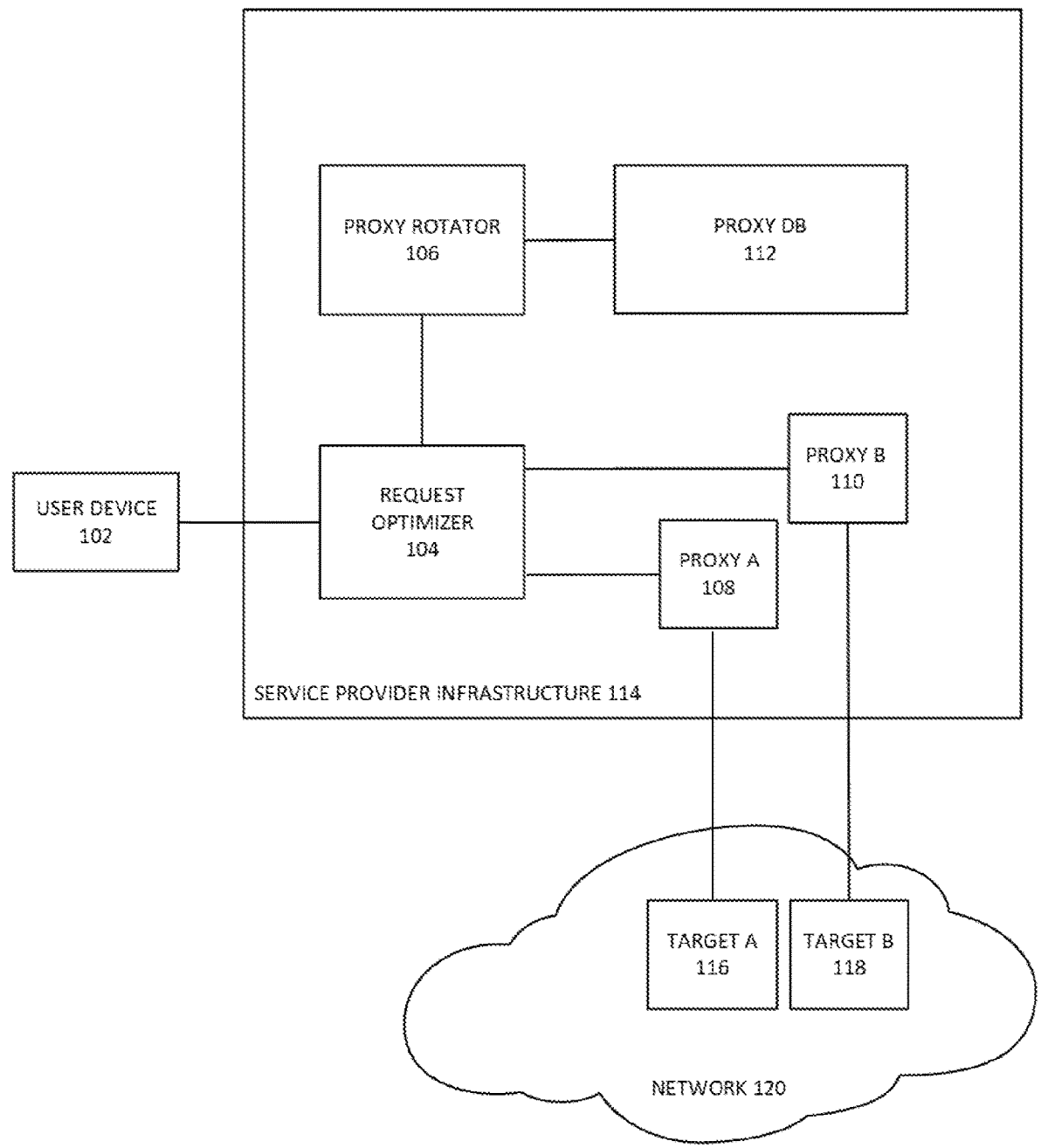
FIG. 1 is an exemplary component diagram that shows the overall architecture of components and context of at least one aspect of solution functions.

Some general terminology descriptions may be helpful and are included herein for convenience and are intended to be interpreted in the broadest possible interpretation.

Elements 104 through 110 identify parts of the Service Provider Infrastructure, with elements 102, 116, 118, 120 showing external components or systems.

User Device 102—can be any suitable user computing device including, but not limited to, a smartphone, a tablet computing device, a personal computing device, a laptop computing device, a gaming device, a vehicle infotainment device, a smart appliance (e.g., smart refrigerator or smart television), a cloud server, a mainframe, a notebook, a desktop, a workstation, a mobile device, or any other electronic device used for making a scraping request.

Request Optimizer 104—is a next generation proxy that is a part of the service provider infrastructure that accepts requests from the User Device and implements the requests through the system. Using an analysis algorithm, the Request Optimizer can read the metadata of the request and adjust the request using different pre-established Scraping strategies to better scrape the Target. It should be noted that the metadata of the response is always visible to the Request Optimizer 104, e.g. URL and HTTP headers. This functionality is necessary for the Request Optimizer 104 to correctly process the request parameters in order to analyze and adjust the request.

Proxy Rotator 106—is a part of the Service Provider Infrastructure and is coupled with separate external components implementing specific assisting functionalities and is responsible for proxy control, rotation, maintenance, collecting statistical data, and reporting.

Proxy A 108 and Proxy B 110—indicate an exemplary multitude of proxy servers (computer systems or applications) opened for the client connection, that act as an intermediary for requests from clients seeking resources from other servers. A client connects to the proxy server, requesting a service, such as a file, a connection, a web page, or other resources available from a different server. The proxy server evaluates the request for content and forwards the request through to the actual target resource, or resources, containing the actual content. After obtaining the content, the proxy server normally forwards the content to the original requestor, but other actions by the proxy (e.g. return error message) can also be performed. In one aspect in at least one of the embodiments detailed herewithin, a proxy server may not have full visibility into the actual content fetched for the original requestor, e.g. in case of an encrypted HTTPS session, if the proxy is not the decrypting the end-point, the proxy serves as an intermediary blindly forwarding the data without being aware of what is being forwarded. However, it should be noted that the metadata of the response is always visible to the Service Provider, e.g. HTTP headers. This functionality is necessary for the proxy to correctly forward the data obtained to the correct requesting party—the end user or the mediating proxy device. Proxy A and Proxy B are presented here as a simple indication that there can be more than one proxy server held at the Service Provides Infrastructure 114. The embodiments should not be limited to the proxies that belong to the Service Provider. The proxies can be owned and managed by any third party, however, the Service Provider always has access and can use such proxies.

Proxy DB 112—is a structured database (DB) that is contained within a data storage device e.g. computer disk or computer memory. The specifics of the implementation of the Proxy DB are of no relevance to the functionality provided, be it an application of horizontal or vertical partitioning; hardware-based clustering; application-level distributed model, with any of these options operating within a single hardware device or in a distributed manner, whereas the data may be spread across multiple schema instances, servers, datacenters, countries or continents for the purpose of spreading the load, improving performance, ensuring resilience of the platform or other objectives. The Proxy DB is populated with data from the Proxy Rotator and contains information about all the proxies available to the Service Provider.

Target A 116 and Target B 118—is an exemplary multitude of web servers serving the content accessible through HTTP/HTTPS protocols. The two targets, Target A and Target B, are presented here as a simple indication that there can be more than one target, but it should not be understood in any way as limiting the scope of the disclosure. There can be an unlimited number of Targets in the Network.

Network 120—is a digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Extranet, Internetwork, Internet.

Scraping logic 202—is an algorithm employed by the Request Optimizer 104 with the designated task of selecting a variety of pre-established request parameters that are chosen for a particular scraping query, to search and collect specific data from the Target. Scraping logic 202 contains a vast number of Scraping strategies 504.

Scraping strategy 504—is a set or request parameters and their values, optimized for a particular type of request or target, that Request Optimizer 104 applies to the original request based on the decisions of what adjustments should be introduced to the original request. The decisions are based on the Scraping logic 202. Scraping strategy 504 may be a pre-defined artefact devised, developed, and manually registered beforehand. Scraping strategy 504 may also be formed by the Scraping logic 202 dynamically based on the automatic aggregated analysis of the scraping results.

Positive response—is an HTTP response deemed relevant and is by default forwarded to the user, such as: 2xx—all Successful responses; 4xx—Client errors (with 5 exceptions: 429, 407, 408, 444, 499).

Negative response—is an HTTP response deemed not acceptable by the user or default system codes meaning unsuccessful results, such as: 429, 407, 408, 444, 499; 5xx—all Server errors.

The one aspect, the scraping system(s) detailed herein uses the standard HTTP request/response model to call and access targets. This model describes the client-server communication via the web. A client sends an HTTP request to the server asking to access specific data. A server sends an HTTP response back to the client with the requested data. The HTTP request indicates the target URL, the access method, the headers and the request body. The HTTP response returns status information, the headers, and the requested data.

In the regular operation of the data-fetching system, the user can only control the URL parameter in the HTTP request. All other parameters of the request are controlled by the data-fetching system.

FIG. 1 shows an exemplary component diagram of the overall architecture of the disclosed components and context of at least one aspect of solution functions. In at least one aspect, the present embodiments show the communications between the User Device 102 and the Service Provider Infrastructure 114 to reach any Target 116; 118 on the Network 120. The Service Provider Infrastructure 114 is combined from the Request Optimizer 104; Proxy Rotator 106; Proxy DB 112; and at least one Proxy 108; 110. FIG.

1 shows that the User Device 102 is not a part of the Service Provider Infrastructure 114, and that is outside of that infrastructure as an independent device. The User Device 102 can be any device that can connect to a Service Provider Infrastructure through any network, but in most cases, through the Internet. Such devices can be a computer, a mobile phone, a tablet, or any other electronic device. FIG. 1 shows that Targets 116; 118 are outside of the Service Provider Infrastructure 114 and are based in any Network 120. In most of the cases the Network 120 is the Internet. The Request Optimizer 104 allows the user to modify the request parameters—HTTP headers & cookies, HTTP methods (such as POST, GET, PUT, PATCH, and DELETE) to some extent. The user also has the ability to establish a HTTP session and define success conditions for the request to the Target servers.

Figure 2:
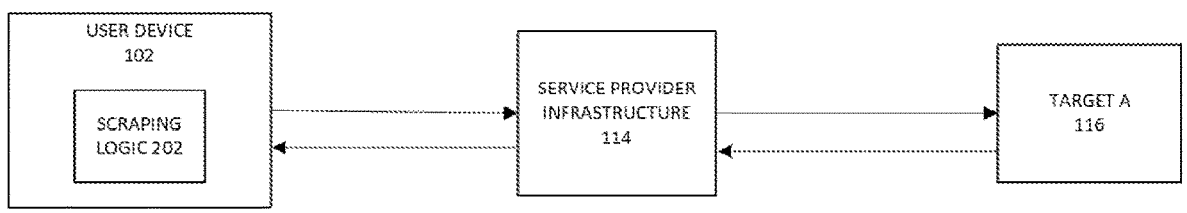
FIG. 2A demonstrates an exemplary prior art general layout of scraping functions currently applied.
FIG. 2B demonstrates an exemplary inventive implementation of scraping techniques with scraping logic based at the service provider.
Figure 2:
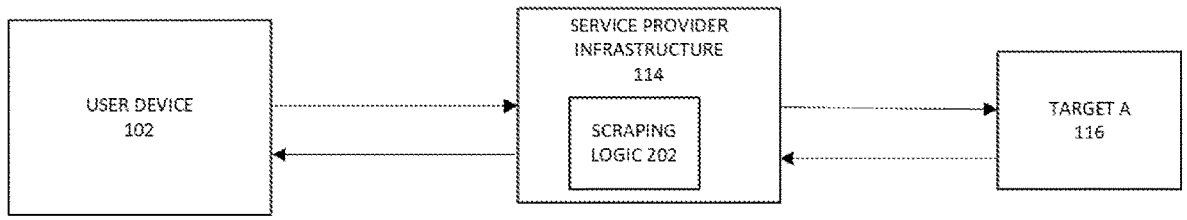

FIG. 2A represents an exemplary prior art device where Scraping logic 202 is placed in the User device 102. FIG. 2B shows current embodiments where the Scraping logic 202 is in the Service Provider Infrastructure 114. Scraping logic has several hundred or thousand scraping strategies. Scraping strategies are developed by analyzing the Target parameters and defining best practices for scraping particular resources based on examining and evaluating the Target's response data. At least some of the scraping request context parameters are established for the appropriate scraping strategy to be selected and applied:

- Establish the initial context for the scraping request comprising the necessary parameters e.g. headers, cookies, user's browser settings that are presented to the Web server during the initial contact. The establishing of said context may require a rigorous process of pre-creating an organic human-like browsing profile by visiting at least one page within the Target other than the page that is the purpose of the scraping, for the purpose of populating the browsing profile with the target Web server's cookies. Other activities of establishing the appropriate session context may include browsing multiple pages within the same target Web server, or for a richer browsing profile—presenting the history of visits to other Web servers, activities in the social networks and similar.
- The appropriate geographic location for the last-mile proxy.
- The appropriate timeout defined for the page to be considered successfully rendered should the headless browser be used as the application for the scraping request.
- The content elements that are mandatory for the page to be considered successfully rendered should a headless browser be used as the application for the scraping request.
- The defined guidelines for processing HTTP redirects.
- The guidelines defining which HTTP codes to be considered as signaling blocked browsing attempts that should be retried.
- The guidelines defining which HTTP codes to be considered blocked by captcha and retried accordingly.
- The guidelines defining which HTTP headers are mandatory for the scraping request, regardless of their presence in the original User's request.
- The guidelines defining which HTTP cookies are mandatory for the scraping request, regardless of their presence in the original User's request.
- The guidelines defining which HTTP headers must be replaced with their counterparts, considered more effective.
- The guidelines defining which HTTP headers must be removed, regardless of the user intentionally including them in the original request.
- The guidelines defining which HTTP headers should be present within the scraping request (e.g. 'User-Agent' for Chrome or Firefox).
- The guidelines defining which type of proxies should be used for the scraping request (Datacenter, Residential, Mobile, etc.). The main factor the proxy choice is aligned to is the Target that the strategies will be used for. A specialized strategy is created for a particular Target based on performing scraping tests and choosing the options that give the best success/failure ratio results. The applied scraping strategy can also depend on the content of the user's request: HTTP method, request parameters, specific requirements defined by the user.

The embodiments detailed herewithin differ from current industry standards for managing Scraping logic in several aspects, including that scraping functions that were previously performed by a user, i.e. the customer, now are performed at the Service Provider's side. In the prior art, the Service Provider Infrastructure 114 does not modify the requests received from the User device 102, instead blindly forwarding the request to the Target 116. The new solution presents a way to ensure that the response from the Target 116 is more accurate by using Scraping logic 202 by the Service provider. Scraping logic contains a set of pre-established rules of assigning a particular scraping strategy, or strategies, to a request, based on the analysis of the request (Scraping strategies). A set of pre-established request parameters and their values, optimized for a particular type of request or target are placed in the Request Optimizer 104, are allowed to be read by the Request Optimizer 104 and adjust the query received from the User device 102.

Figure 3:
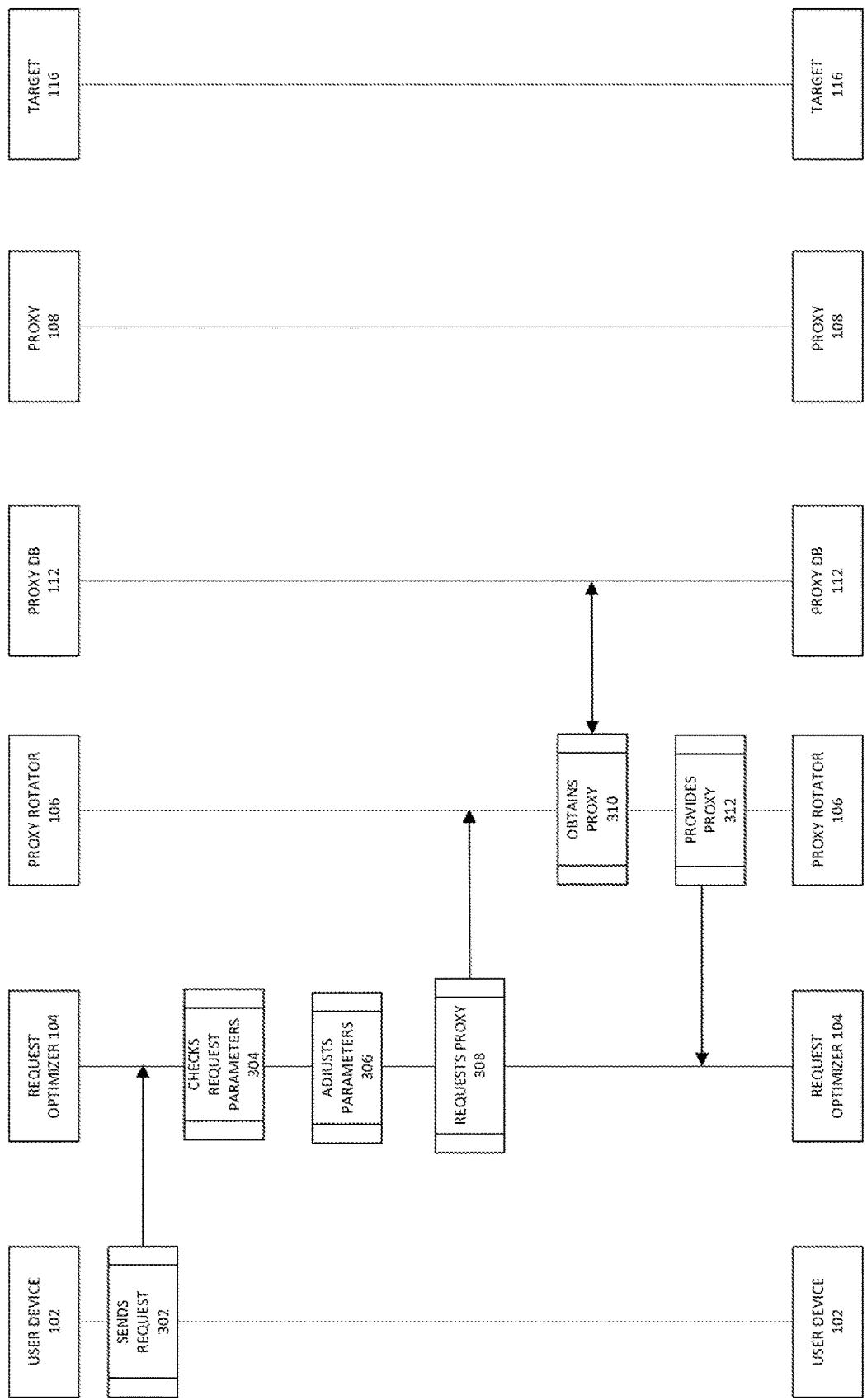
FIG. 3A is an exemplary sequence, diagram, describing the route of the scraping request using a next generation proxy.
FIG. 3B is an exemplary diagram of the scraping request and is a continuation of FIG. 3A.
Figure 3:
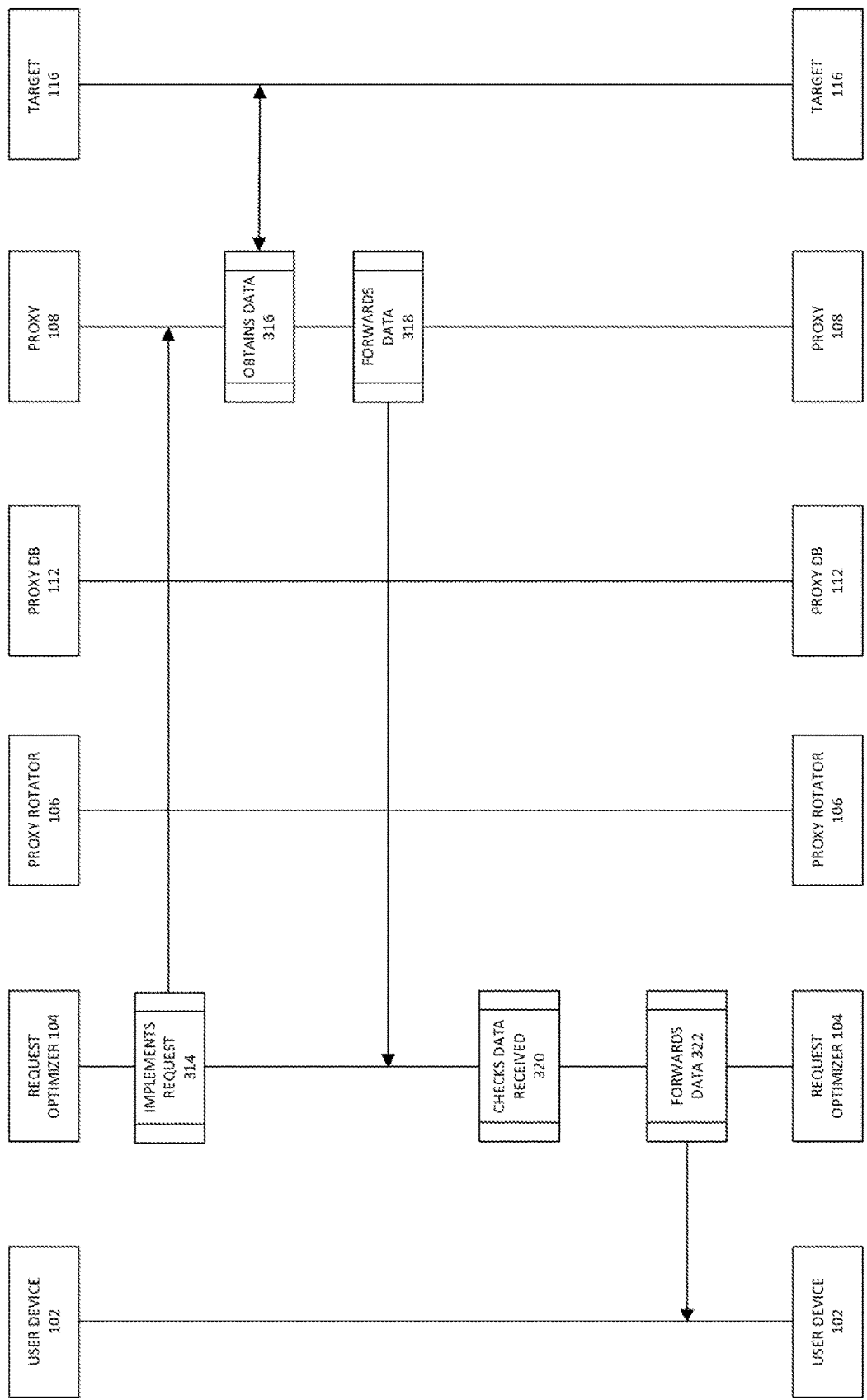

FIG. 3A is a sequence diagram, describing the route of a scraping request. FIG. 3B is the continuation flow of the scraping request. The flow starts once the User device sends a request (step 302) to the Service provider, more precisely to the Request Optimizer 104. The Request Optimizer 104 checks the request parameters (step 304), with at least the URL address, the headers, and the cookies being checked. The request body can also be modified under the particular situations, e.g., if the Target of the scraping request is a web page within the ".com" top-level domain (TLD), the strategy will add the requirement to use the proxies that have US as their geolocation. The HTTP response body is also analyzed to learn if the data obtained conforms to the request. Similarly, the parameters of the user's request can be changed to get better scraping results. One example of such changes can be described as follows:

A user dispatches a scraping request to the Service provider, where the HTTP request body has its content type defined as one of the Multipurpose Internet Mail Extensions (MIME) types of "compressed file" e.g. in .zip format (MIME type=application/zip). However, the Service provider identifies the Target as a system, that works better with compressed data in .gz format (MIME type=application/gzip). The request optimizing platform within the Service provider Infrastructure examines the headers and the body of the request, identifies this discrepancy, and adjusts them accordingly, converting the content to the appropriate format as well as updating the corresponding headers.

Another example of the HTTP request body adjustment is a user's request containing an XML content in the body (i.e. MIME type=application/xml). A service provider has a pre-established scraping logic guidelines informing that the requested target will, with high probability, block HTTP requests with XML content in the body that is non-readable by a human. Therefore, the service provider aligns the request to the peculiarities of the Web server e.g. changes the content type (e.g. to MIME type=text/xml). In this situation, the body and the headers of the request are adjusted by the service provider to avoid blocking by the Target and correspondingly to receive better scraping results. In yet another example the HTTP request body can become encrypted employing the Service provider's encryption toolset while changing the request, with the artefacts necessary for description transferred to the destination party either through an alternative channel or in a custom header within the request.

Thus, if the parameters within the request are not deemed aligned with the corresponding Target in the fashion considered most effective, they are adjusted according to the Scraping Logic 202 loaded into the memory of the Request Optimizer 104 (step 306). The Request Optimizer 104 checks if the URL address is indicated correctly, and, if not, then the URL address is corrected in a way to minimize blocking rate. The Request Optimizer 104 also checks the Headers and Cookies of the request and adjusts them in a way to increase the quality of the request as well as the quality of the data that is expected to be received from a Target.

The HTTP request body can also be modified under particular circumstances, e.g. if the target of the scraping request is in ".com" TLD, the Scraping logic guidelines dictate that US-geolocated proxies are requested for servicing the request. The HTTP request body is also analyzed and adjusted if necessary to ensure better results of the scraping.

In at least one instance, after getting the request from the user and constructing the initial scraping session context, for a particular strategy to be selected for the request, certain guidelines are applied to user requests before scraping the actual target page:

- the level of detail the browsing profile of the scraping agent should have, i.e., if the home page of the Target should be visited prior to the actual scraping, how many visits to the Target's web pages needs are needed, if only one visit to the front page or other pages is needed to create an organic footprint of a user, and/or if visiting the web pages other than the Target, e.g., social networks, entertainment sites, electronic shops etc., is needed
- geolocation of the proxy provided by Proxy Rotator 106.
- timeout threshold for rendering the page in case a headless browser is used.
- content elements that must be present to consider the page rendered in case a headless browser is used.
- Whether to follow redirects.
- HTTP status codes that should be considered blocked and retried accordingly.
- HTTP status codes that should be considered blocked by captcha and retried accordingly.
- HTTP request headers that should always be inserted into the request, regardless if the user included them originally.
- HTTP request cookies that should always be inserted into the request, regardless if the user included them originally.
- HTTP request headers that must be replaced with their better counterparts.
- HTTP request headers that must be removed from the request, even if the user included them in the request.
- types of HTTP request headers that should be present (e.g. 'User-Agent' for Chrome or Firefox).
- type of proxies that should be used (Datacenter, Residential, Mobile, etc.)

The activities of optimizing the HTTP requests submitted by customers are transparent, i.e., once launched by the user, the request is subjected to the analysis and adjustments according to the selected scraping strategy, while no interaction from the originating user is required.

If the Request Optimizer 104 notices inefficiencies or errors in the request's headers and cookies, it adjusts the parameters according to a set of pre-established rules of assigning a particular scraping strategy, or strategies, to a request (applies Scraping logic 202). HTTP headers are components of the request message and are used to pass to the server additional information about the requested target. They are defined in the HTTP message as key-value pairs. The sample HTTP request message can include the following parameters: target address (e.g. http://scraping.com:60000), language requirements (e.g. en-US); content/type of request (e.g. application/octet-stream), indicate custom header, geolocation (e.g. US), cookie index (e.g. SID=1234567890; SLK_TJJ=0987654321). If the request does not need modifications, no corrections are performed by the Request Optimizer 104, however, the Request Optimizer 104 checks the content of the request.

In at least one aspect, the embodiments detailed herewithin further explain that the Request Optimizer 104 obtains a proxy from the Proxy Rotator 106. Once the request parameters are adjusted, the Request Optimizer 104 asks the Proxy Rotator 106 for a particular proxy (step 308). Proxy Rotator 106 accesses the Proxy DB 112 and chooses a particular proxy that is suitable to implement the user's request (step 310). Proxy Rotator 106 provides Request Optimizer 104 with the information about the proxy (step 312). FIG. 3B continues the steps from those shown in FIG. 3A. Request Optimizer 104 implements the requests through the Proxy 108 provided by the Proxy Rotator 106 (step 314). Having obtained a proxy, Request optimizer 104 continues to implement a request received from the User device (step 314). Proxy 108 obtains data from the indicated Target 116 (step 316) and forwards that data to the request optimizer 104 (step 318). Proxy 108 obtains data from the Target 116 (step 316). Target can be any web resource in the Network, and the Network usually is the Internet. Once the Proxy 108 obtains the data, the Proxy 108 sends the data back to the Request Optimizer 104 (step 318). The Proxy 108 does not make any modifications to the data received and does not check the scope or the quality of the data. Proxy 108 simply transfers the data received from the Target 116 to the Request Optimizer 104. The Request Optimizer 104 checks the metadata of the response (step 320). Proxy 108 neither amends nor reads the information obtained from the Target 116, as it merely forwards the data. However, Request optimizer 104 checks the metadata of the response, i.e., examines the parameters of the reply received from the Target (step 320), e.g., HTTP response code.

When the server response is received, the HTTP message bears details about the response status. Response status informs what is the result of attempting to reach Target 116. Response status codes refer to groups of possible results:
  2xx—Successful responses (positive response);
  3xx—Redirects (positive response);
  4xx—Client errors (positive response with exceptions);
  5xx—Server errors (negative response).

In the operation of web crawling and scraping system, the HTTP responses regarded as positive are passed to the next data processing step.

In the regular operation of the system, the user has no control over this setting. By default, only 2xx codes are considered to be passable. When the Request Optimizer 104 is implemented in the system, the user can declare specific, other than default, status codes as passable. The system treats the responses with the declared status codes as correct and passes the fetched data to the next data processing step (322).

Specific status codes are declared in the HTTP request headers, using 'x-successful-status-codes' header with a value containing a list of successful status codes: [500, 502, 42069]. If the user does not declare specific status codes, the Request Optimizer 104 operates on default settings:

1xx—An informational response indicates that the request was received and understood. It is issued on a provisional basis while request processing continues. It alerts the client to wait for a final response.

2xx—the system treats the response as OK.

3xx—the system follows redirections for a limited number of times by default. When the limit is exhausted, the system registers a failed job.

4xx—the system treats the response as OK with five exception codes 429, 407, 408, 444, 499.

5xx—the system retries a limited number of times. When the limit is exhausted, the system registers a failed job.

If the user chooses to use the Custom HTTP request headers for declaring non-default behavior for processing specific HTTP response status codes, the Request Optimizer 104 acts in the following manner:

1xx—the system informs the user that the specified status codes are intermittent and that changing the way they are processed is not supported.

2xx—the system informs the user that the specified status codes always denote a successful operation and changing the way they are processed is not supported.

3xx—the system informs the user that it follows the default behavior of following the redirect instruction from the server.

4xx—the system informs the user that the status codes specified are returned to the user, omitting the excluded codes (listed below). The excluded codes may be treated as a positive result, if so desired by the user.

5xx—the system accepts user changes to the default behavior if the code specified is a full 5xx HTTP response code. In case the response code in the reply matches the configuration exactly—the data is returned to the user. Otherwise, the system follows the default behavior of retrying the request.

4xx (with five exception codes 429, 407, 408, 444, 499) are treated as a positive result and data of such requests is returned to the user. If the system receives one of the five exceptions, it repeats the request again, until the positive response is received or the number of attempts is exhausted. However, the user may specify custom processing for the exception codes and have the data of such responses forwarded to the user.

If the Target's response HTTP headers contain the HTTP response codes declared as positive, the data is forwarded to the User Device 102 by the Request optimizer 104 (step 322). In this step, User Device 102 receives the actual data, e.g., the body of the HTTP response, and the metadata—the headers, one of them containing the HTTP response status code, and as part of the metadata—the custom headers carrying detailed information about the scraping job status.

Figure 4:
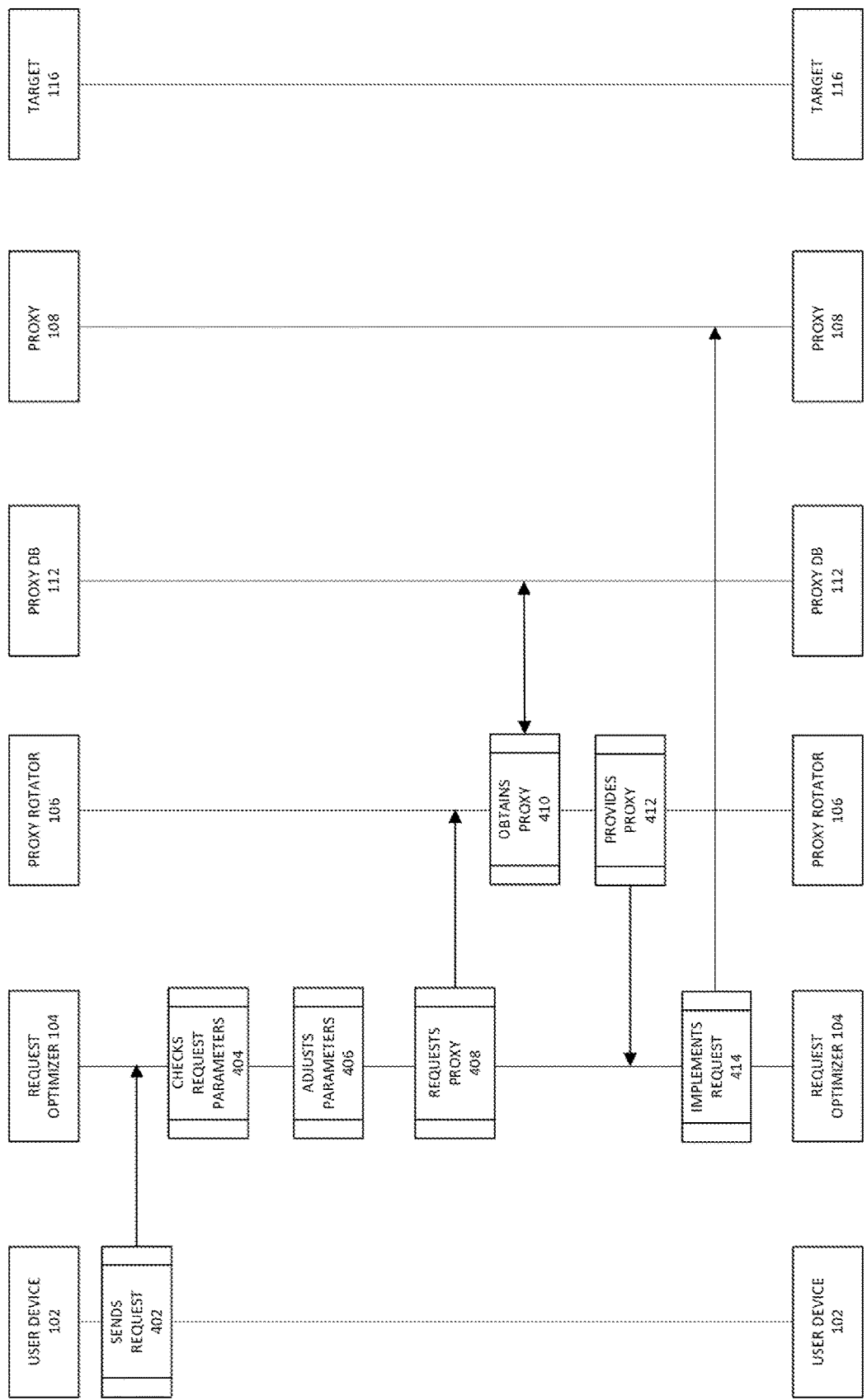
FIG. 4A is an exemplary sequence diagram of the scraping request when the target returns an erroneous reply.
FIG. 4B is an exemplary sequence diagram of the scraping request when the target returns an erroneous reply and is a continuation of FIG. 4A.
FIG. 4C is an exemplary sequence diagram of the scraping request when the target returns an erroneous reply and is a continuation of FIG. 4A.
Figure 4:
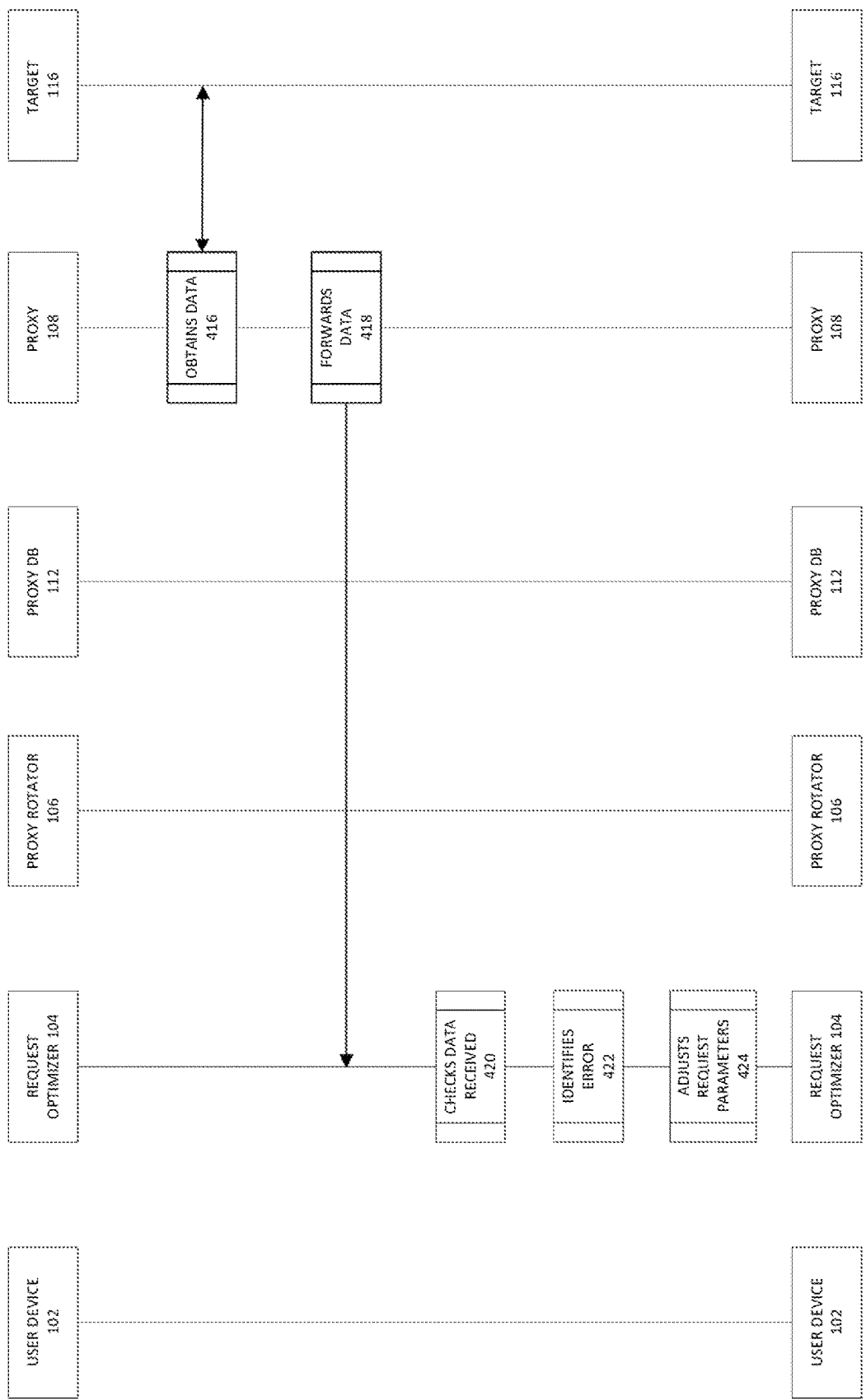
Figure 4:
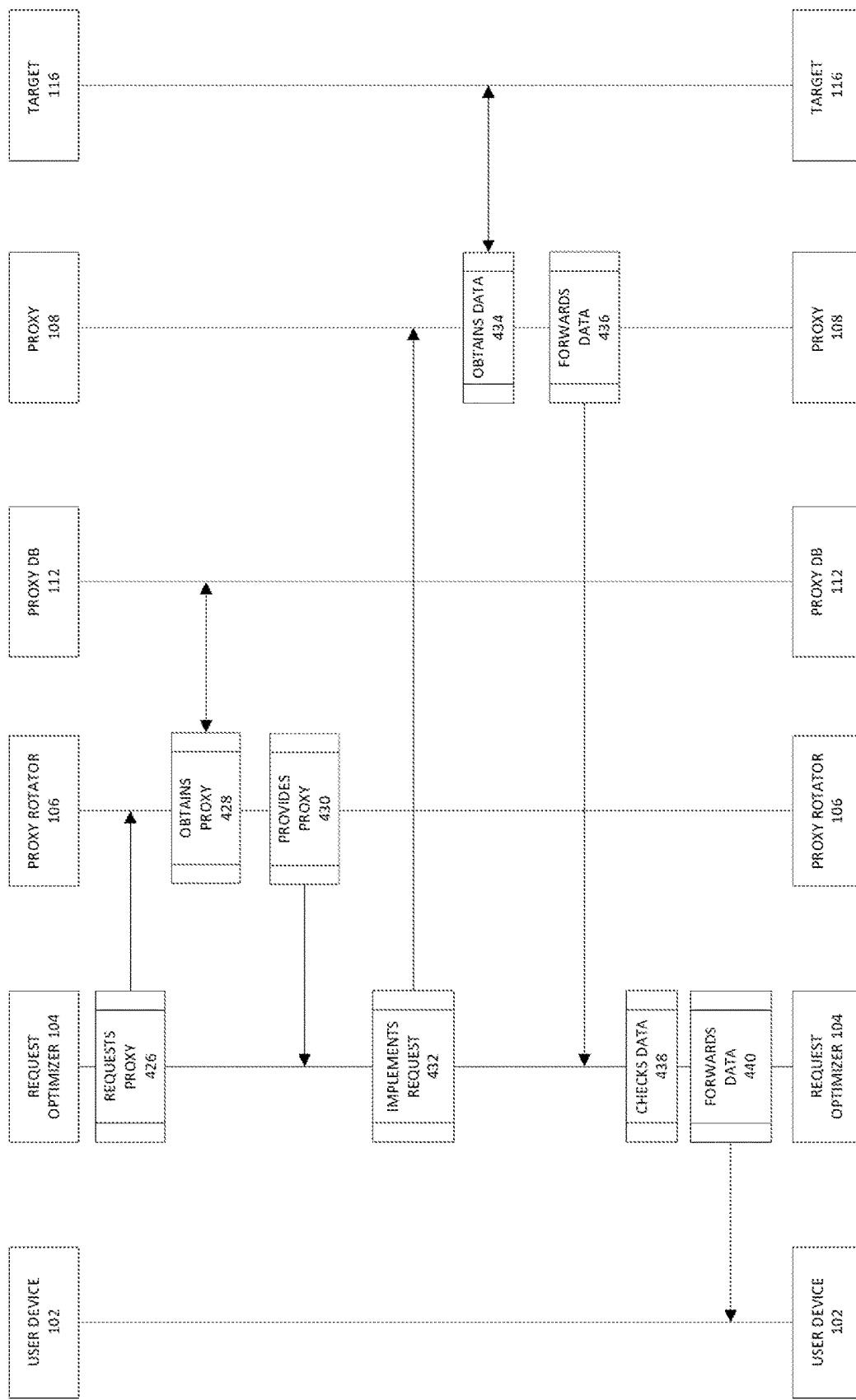

FIGS. 4A, 4B, and 4C are an exemplary series of sequence diagrams, describing the route of the scraping request when the target returns an erroneous reply. These figures show essentially the same steps for requesting a proxy by the Request Optimizer 104 and using that proxy to implement the user's request. The flow starts once the User device sends a request (step 402) to the Service provider, more precisely to the Request Optimizer 104. The Request Optimizer 104 checks the request parameters (step 404), and the headers and cookies. If the parameters are not indicated as correct, they are adjusted according to the Scraping logic 202 loaded into the memory of the Request Optimizer 104 (step 406). In at least one embodiment detailed herewithin, the disclosure further explains that Request Optimizer 104 obtains a proxy from the Proxy Rotator 106. Request Optimizer next requests proxy (step 408). Proxy Rotator 106 obtains the proxy from Proxy DB 112 (step 410) and provides the proxy to the Request Optimizer 104 (step 412). Having obtained a proxy, Request Optimizer 104 continues to implement a request received from the User device (step 414). Proxy 108 obtains data from the indicated Target 116 (step 416) and forwards that data to the Request Optimizer 104 (step 418). The Proxy 108 does not make any modifications to the data received and does not check the scope or the quality of data. A Proxy 108 simply transfers the data received from the Target 116 to the Request Optimizer 104. The Request Optimizer 104 checks the metadata received (step 420), and, if the response status is negative (for example, 4xx code exceptions such as 429, 407, 408, 444, 499, or 5xx codes), the Request Optimizer 104 treats the response as failed and does not send the data to the user (step 422). In such situations, the Request Optimizer 104 adjusts request parameters (step 424) and repeats the adjusted request. The request can be adjusted by changing some parameters of the request according to the directions within the selected scraping strategy, trying to use another pre-establish scraping strategy, or attempting the scraping request to the Target without any changes in the strategy.

A scraping request may be adjusted according to the analysis of the Target's response e.g. if the metadata within the reply presents HTTP response code 504—the Request Optimizer may apply a scraping strategy introducing an additional header, whereas HTTP response code 403 may require applying a strategy that enriches the request with organic user-like behavioral markers e.g. cookies from previous visits to the Target or other web resources.

All parts of the Target's response, as well as their content, may be relevant for deciding on the appropriate adjustments on the overall scraping strategy of the request. Some details on how the Target returns the requested data may also be relevant.

The Request Optimizer 104 requests a proxy from the Proxy Rotator 106 (step 426). Proxy Rotators 106 obtains a proxy from Proxy DB 112 (step 428) and provides the information about the proxy to the Request Optimizer 104 (step 430). Request Optimizer 104 uses the proxy 108 to implement the request (step 432). Proxy 108 obtains the data from the Target 116 (step 434) and forwards the data to the Request Optimizer 104 (step 436). Request optimizer 104 checks the metadata (step 438) and sends the data to the User Device 102 if the reply is positive (step 440). If the response is not positive, Request Optimizer repeats the steps of adjusting request parameters and sending the request to the target using the selected proxy (i.e., steps 406 to 438 are repeated). These steps of checking the response from the Target and repeating the request if the response is negative, can be repeated until a positive response is received or until the number of negative replies reaches some indicated number (for example, the Request Optimizer 104 can be configured to adjust the parameters of the request 25 times or more, and if within 25 times the response is still negative, the negative results are sent to the User Device 102).

In another aspect, at least one embodiment detailed herewithin the Request Optimizer 104 allows maintaining a session for multiple HTTP requests, which is a feature of data-fetching systems. Here, a session is implemented using the same exit node for multiple HTTP requests. In one exemplary operation of Request Optimizer 104, a session includes the use of the same IP proxy, same headers, and same cookies through the entire session. The exemplary operation enables sending GET and POST requests (i.e. receiving and sending data) during the same session as well. Request Optimizer 104 can keep the same session with the same Proxy 108 open for several continuous requests in the context of the same scraping session coming from a single User's Device. First, an initial user's request indicates that a persistent session should be maintained for future requests by creating an identification marker for the session in the format of a string, e.g. "1234567890abcdef". Upon receiving a request with the session id marker, the Request Optimizer 104 is sufficiently informed to command the proxy management platform to register the session as persistent to that particular proxy and to register that connection with the indicated session identification marker. To continue using the same proxy for the next request, the user provides the previously established session identification while submitting the scraping request. The proxy management will provide the same proxy and re-establish connection to the Target through the same proxy. However, it should be noted that the session identification has an expiration threshold, which is considered trespassed when either a) a predefined period of time has elapsed, or b) the number of requests that can utilize the same session has been executed. After the expiration, the next request containing the expired session identification will result in a new persistent session initiated.

The system creates a session with the indicated session_id, pairs the session with the specific IP proxy and the specified HTTP headers, and keeps the same exit node for the entire session. Further, the following parameters are set by the system to the session: session_uuid, session_expires_at, session_remaining. These parameters are systematic, i.e., a user has no control over them. A session is kept open until the session time expires or until an error occurs.

Figure 5:
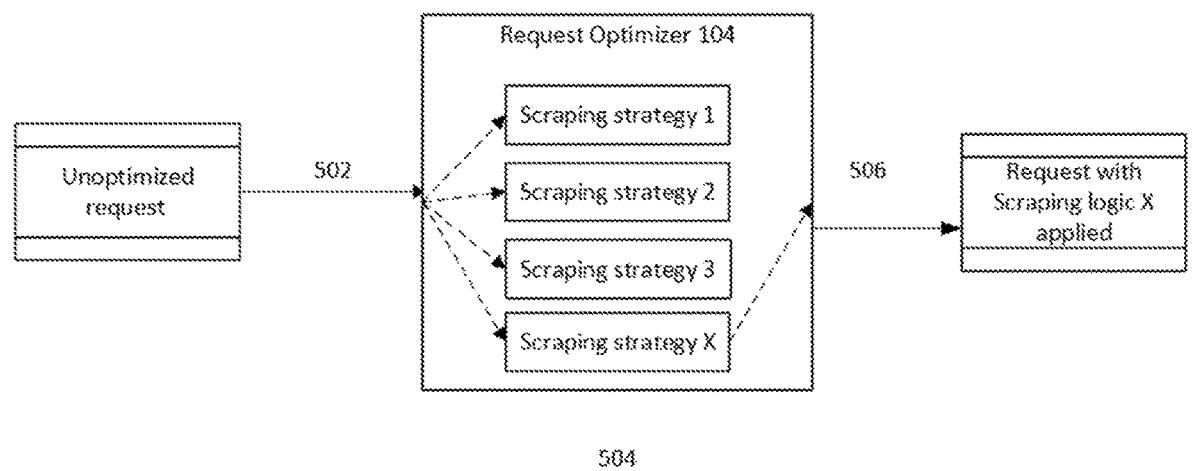
FIG. 5 is an exemplary sequence diagram describing the optimization of the scraping request by the next generation proxy.

FIG. 5 presents an exemplary sequence diagram, describing the optimization of the scraping request. The request with unoptimized logic is received by the Request Optimizer 104 (step 502). Request optimizer 104 chooses an adequate scraping strategy according to the request needs and targets (step 504), with a variety of scraping strategies being created and stored in the Request Optimizer 104. Any such strategy or a combination thereof can be used by the Request Optimizer 104 to adjust the request in order to have better scraping results. An example of such a strategy may be introducing or adjusting custom headers identifying geographical location, time zone, or the locale language to be used in the request. Once the request is adjusted, it is subjected to further processing (step 506).

Figure 6:
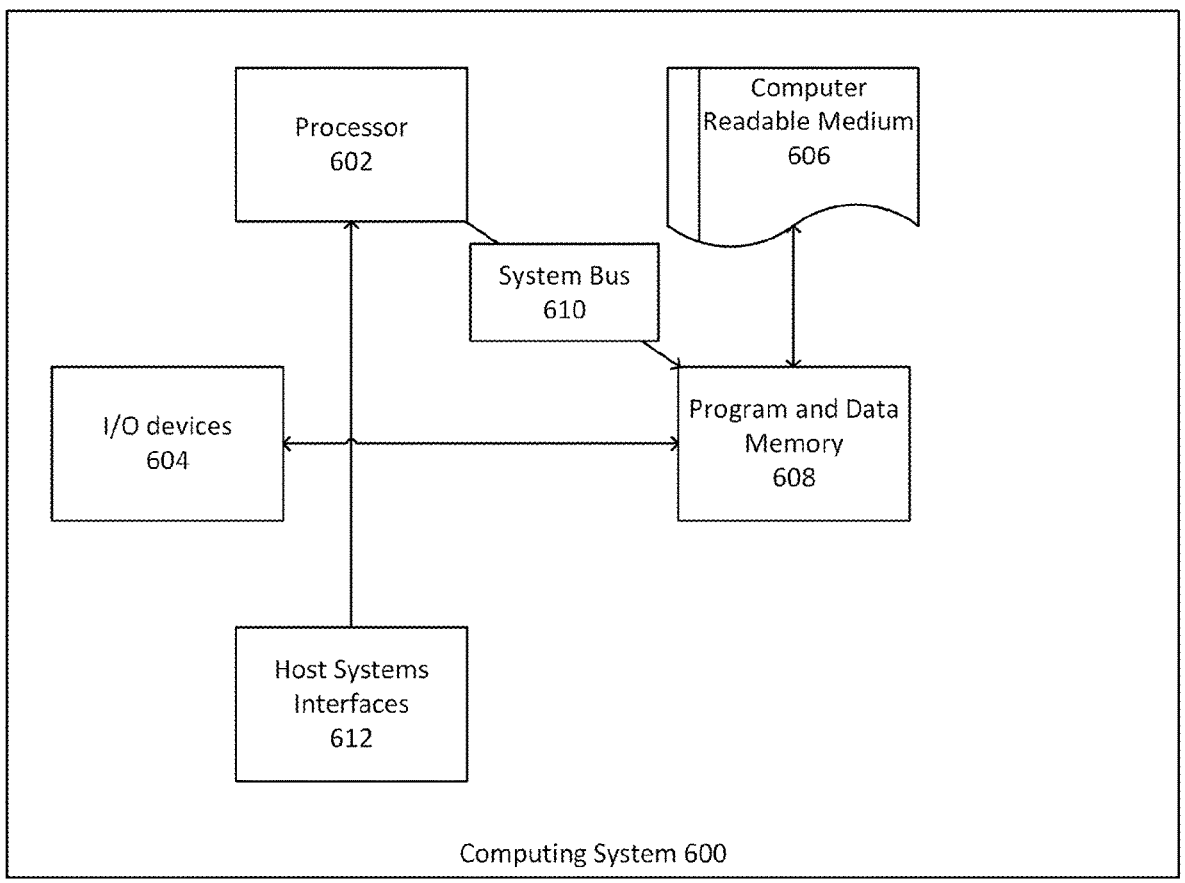
FIG. 6 is an exemplary computing system performing the methods disclosed.

Any of the above embodiments herein may be rearranged and/or combined with other embodiments. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 6 illustrates a computing system 600 in which a computer readable medium 606 may provide instructions for performing any of the methods disclosed herein.

Furthermore, the embodiments can take the form of a computer program product accessible from the computer readable medium 606 providing program code for use by or in connection with a computer or any instruction execution system. For the purposes of this description, the computer readable medium 606 can be any apparatus that can tangibly store the program for use by or in connection with the instruction execution system, apparatus, or device, including the computer system 600.

The medium 606 can be any tangible electronic, magnetic, optical, electromagnetic, infrared, or semiconductor system (or apparatus or device). Examples of a computer readable medium 606 include a semiconductor or solid state memory, magnetic tape, a removable computer diskette, a random access memory (RAM), NAND flash memory, a read-only memory (ROM), a rigid magnetic disk, and an optical disk. Some examples of optical disks include compact disk-read only memory (CD-ROM), compact disk-read/write (CD-R/W) and digital versatile disc (DVD).

The computing system 600, suitable for storing and/or executing program code, can include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution. Input/output or I/O devices 604 (including but not limited to keyboards, displays, pointing devices, etc.) can be coupled to the system either directly or through intervening I/O controllers. Network adapters may also be coupled to the system to enable the computing system 600 to become coupled to other data processing systems, such as through host systems interfaces 612, or remote printers or storage devices through intervening private or public networks. Modems, cable modem and Ethernet cards are just a few of the currently available types of network adapters.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The disclosure presents a system and a method for data extraction and gathering from a web server comprising: comparing parameters of a request received from a user's device with a list of scraping strategies; selecting, from the list of scraping strategies, a scraping strategy corresponding to the parameters of the request; identifying discrepancies between the request and the scraping strategy; adjusting the parameters of the request according to the scraping strategy to form an adjusted request; sending the adjusted request to a target through a proxy selected according to the scraping strategy; receiving a reply from the target.

Upon receiving the request, a Service Provider Infrastructure performs the adjusting of the parameters of the request autonomously from the user's device.

The method further comprises checking and analyzing the response's metadata received from the target and forwarding the reply to the user's device pursuant to the analysis of the metadata.

If the reply received from the target is negative, the method is repeated by adjusting the parameters of the request according to a different scraping strategy from the list of scraping strategies to form a different adjusted request that is then sent to the target. The method is repeated with alternative scraping strategies selected from the list of scraping strategies until a positive response is obtained or until a maximum number of attempts is reached.

During the adjustments, at least one of the parameters within the following components of the request is adjusted: URL address; Headers; Cookies; Request body. The parameters of the request are not adjusted if the request received from the user's device is aligned to one of the scraping strategies from the list.

The proxy is selected by a Service Provider Infrastructure from a Proxy database. The Proxy is selected according to the scraping strategy and includes geolocation settings, proxy type, proxy availability, or any combination thereof. The proxy can remain available for multiple user device requests.

The method uses the Request Optimizer and its operational settings include at least one of the following: scraping strategies, session ID numbers, servers accepted as request originators, operation timeframes, scheduled maintenance jobs, connectivity sessions timeouts, request processing logs, or any combination thereof and such settings are stored in a database on disk, in a flat file on disk, in a database in memory, or other storage media.

The target that is reached by the proxy server is a web server serving the reply accessible by HTTP/HTTPS protocols and is attached to a network. The method can use a proxy server that is integrated into a Service Provider Infrastructure or be separate from a Service Provider Infrastructure.

The embodiments discloses the system for data extraction and gathering from a network comprising at least: a proxy rotator operable to provide a plurality of proxies over the network; and a request optimizer operable to compare parameters of a request received from a user's device with a list of scraping strategies, to select a scraping strategy from the list of scraping strategies a scraping strategy that corresponds to the parameters of the request, to identify discrepancies between the request and the scraping strategy, to adjust the parameters of the request according to the scraping strategy to form an adjusted request, and to send the adjusted request to a target through a proxy selected from a proxy database by the proxy rotator according to the scraping strategy.

The disclosures also present a non-transitory computer readable medium for data extraction and gathering from a Web server comprising instructions which, when executed by a computing device within a Service Provider Infrastructure, cause the computing device to: compare parameters of a request received from a User's Device with a list of scraping strategies; select, from the list of scraping strategies, a scraping strategy corresponding to the parameters of the request; identify discrepancies between the request and the scraping strategy; adjust the parameters of the request according to the scraping strategy to form an adjusted request; send the adjusted request to a target through a proxy selected according to the scraping strategy; receive a reply from the target. Later, checking and analyzing the metadata of the response received from the target and forwarding the reply to the user's device pursuant to the analysis of the metadata. If the reply received from the target is negative, operation of the medium repeats by adjusting the parameters of the request according to a different scraping strategy from the list of scraping strategies to form a different adjusted request that is then sent to the Target. The operation of the medium is repeated with alternative scraping strategies selected from the list of scraping strategies until a positive response is obtained or until a maximum number of attempts is reached. The proxy can remain available for multiple user's device requests. At least one of the following parameters of the request is adjusted: URL address; Headers; Cookies; Request body. The parameters of the request are not adjusted if the request received from the user's device is aligned to one of the scraping strategies from the list.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural forms can be used, but it does not limit the scope of the disclosure and the same teaching can apply to multiple objects, even if in the current application an object is referred to in its singular form.

It will be appreciated that some embodiments describe the use of one or more generic or specialized databases (such as "Proxy DB", or similar), that contains a collection of information that is organized so that it can be easily accessed, managed and updated. Computer databases typically contain aggregations of data records or files, in the current case, databases usually store different information and statistics about the proxies or exit nodes, information about utilization threshold of the exit node provider. Such databases can also contain information about the clients, requests performed, networks used, proxies used, types of proxies requested and similar data. Databases are structured to facilitate the storage, retrieval, modification, and deletion of data in conjunction with various data-processing operations.

The embodiments detailed herewithin are provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method for data extraction and gathering from a web server comprising:
    comparing parameters of a request received from a user device with a list of scraping strategies;
    selecting, from the list of scraping strategies, a scraping strategy corresponding to the parameters of the request;
    identifying discrepancies between the request and the scraping strategy;
    adjusting the parameters of the request according to the scraping strategy to form an adjusted request;
    sending the adjusted request to a target through a proxy selected according to the scraping strategy;
    receiving a reply from the target.

2. The method of claim 1, further comprising:
    checking and analyzing the metadata of the reply received from the target.

3. The method of claim 2, further comprising:
    forwarding the reply to the user device pursuant to the analysis of the metadata.

4. The method of claim 1, wherein if the reply received from the target is negative, the method repeats by adjusting the parameters of the request according to a different scraping strategy from the list of scraping strategies to form a different adjusted request that is then sent to the target.

5. The method of claim 4, wherein the method is repeated with alternative scraping strategies selected from the list of scraping strategies until a positive response is obtained or until a maximum number of attempts is reached.

6. The method of claim 1, wherein at least one of the parameters within the following components of the request is adjusted:
    a. URL address;
    b. headers;
    c. cookies;
    d. request body.

7. The method of claim 1, wherein the proxy is selected by a service provider infrastructure from a proxy database.

8. The method of claim 7, wherein the proxy is selected according to the scraping strategy and includes geolocation settings, proxy type, proxy availability, or any combination thereof.

9. The method of claim 1, wherein the proxy remains available for multiple user device requests.

10. The method of claim 1, wherein the parameters of the request are not adjusted if the request received from the user device is aligned to one of the scraping strategies from the list.

11. The method of claim 1, wherein request optimizer operational settings include at least one of the following: scraping strategies, session ID numbers, servers accepted as request originators, operation timeframes, scheduled maintenance jobs, connectivity sessions timeouts, request processing logs, or any combination thereof and such settings are stored in a database on disk, in a flat file on disk, in a database in memory, or other storage media.

12. The method of claim 1, wherein the target is a web server serving the reply accessible by HTTP/HTTPS protocols and is attached to a network.

13. The method of claim 1, wherein the proxy is a proxy server integrated into a service provider infrastructure.

14. The method of claim 1, wherein the proxy is a proxy server separate from a service provider infrastructure.

15. The method of claim 1, wherein upon receiving the request, a service provider infrastructure performs the adjusting of the parameters of the request autonomously from the user device.

16. A system for data extraction and gathering from a network comprising at least:
    a proxy rotator operable to provide a plurality of proxies over the network; and
    a request optimizer operable to compare parameters of a request received from a user device with a list of scraping strategies, to select a scraping strategy from the list of scraping strategies a scraping strategy that corresponds to the parameters of the request, to identify discrepancies between the request and the scraping strategy, to adjust the parameters of the request according to the scraping strategy to form an adjusted request, and to send the adjusted request to a target through a proxy selected from a proxy database by the proxy rotator according to the scraping strategy.

17. The system of claim 16, wherein the request optimizer can adjust the request received from the user device by modifying at least one of the parameters within the following components:
    a. URL address;
    b. headers;
    c. cookies;
    d. request body.

18. The system of claim 16, wherein the request optimizer utilizes the same proxy for an unlimited number of requests received from the same user device.

19. A non-transitory computer readable medium for data extraction and gathering from a web server comprising instructions which, when executed by a computing device within a service provider infrastructure, cause the computing device to perform:
    comparing parameters of a request received from a user device with a list of scraping strategies;
    selecting, from the list of scraping strategies, a scraping strategy corresponding to the parameters of the request;
    identifying discrepancies between the request and the scraping strategy;
    adjusting the parameters of the request according to the scraping strategy to form an adjusted request;
    sending the adjusted request to a target through a proxy selected according to the scraping strategy;
    receiving a reply from the target.

20. The method of claim 19, further comprising:
    checking and analyzing the metadata of the reply received from the target.

21. The method of claim 20 further comprising:
    forwarding the reply to the user device pursuant to the analysis of the metadata.

22. The non-transitory computer readable medium of claim 19, wherein if the reply received from the target is negative, operation of the medium repeats by adjusting the parameters of the request according to a different scraping strategy from the list of scraping strategies to form a different adjusted request that is then sent to the target.

23. The non-transitory computer readable medium of claim 22 wherein the operation of the medium is repeated with alternative scraping strategies selected from the list of scraping strategies until a positive response is obtained or until a maximum number of attempts is reached.

24. The non-transitory computer readable medium of claim 19, wherein the proxy remains available for multiple user device requests.

25. The non-transitory computer readable medium of claim 19, wherein at least one of the following parameters of the request is adjusted:
   a. URL address;
   b. headers;
   c. cookies;
   d. Request body.

26. The non-transitory computer readable medium of claim 19, wherein the parameters of the request are not adjusted if the request received from the user device is aligned to one of the scraping strategies from the list.

* * * * *